US012662284B2

(12) United States Patent
Grossetete et al.

(10) Patent No.: US 12,662,284 B2
(45) Date of Patent: Jun. 23, 2026

(54) PACKAGING OF FOOD PRODUCTS AND ASSOCIATED PACKAGING DEVICE

(71) Applicants: GENEOMAT, Chadeleuf (FR); NATURAL DEVELOPMENT, Arles (FR)

(72) Inventors: Thierry Grossetete, Chadeleuf (FR); Philippe l'Hospital, Barbentane (FR)

( * ) Notice: Subject to any disclaimer, the term of this patent is extended or adjusted under 35 U.S.C. 154(b) by 119 days.

(21) Appl. No.: 18/218,800

(22) Filed: Jul. 6, 2023

(65) Prior Publication Data

US 2024/0116668 A1 Apr. 11, 2024

(30) Foreign Application Priority Data

Jul. 7, 2022 (FR) ....................................... 2206944

(51) Int. Cl.

| | |
|---|---|
| ***B65D 5/60*** | (2006.01) |
| ***B31B 50/26*** | (2017.01) |
| ***B31B 100/00*** | (2017.01) |
| ***B65D 5/20*** | (2006.01) |
| ***B65D 5/42*** | (2006.01) |
| *B31B 120/30* | (2017.01) |
| *B31B 120/40* | (2017.01) |

(52) U.S. Cl.

CPC .............. *B65D 5/603* (2013.01); *B31B 50/26* (2017.08); *B65D 5/2047* (2013.01); *B65D 5/4266* (2013.01); *B31B 2100/00* (2017.08); *B31B 2120/302* (2017.08); *B31B 2120/40* (2017.08)

(58) Field of Classification Search

CPC .... B65D 5/603; B65D 5/2047; B65D 5/4266; B65D 5/563; B65D 75/305; B65D 77/2024; B65D 2577/2025; B65D 21/0233; B65D 5/566; B65D 81/3453; B65D 77/20; B65B 5/02; B31B 2120/402; B29C 66/849

USPC ... 229/103.11, 125.35, 186, 113, 123.1, 407, 229/902; 220/359.4

See application file for complete search history.

(56) References Cited

U.S. PATENT DOCUMENTS

| | | | | |
|---|---|---|---|---|
| 3,316,102 A * | 4/1967 | Doll | ..................... | B65D 5/2033 229/116 |
| 5,167,339 A * | 12/1992 | Takata | .................... | B32B 27/08 229/123.1 |
| 5,253,801 A * | 10/1993 | Bernstein | ............. | B65D 5/2047 229/113 |
| 9,718,576 B2 * | 8/2017 | Moore | .................... | B31B 50/81 |

(Continued)

FOREIGN PATENT DOCUMENTS

| | | |
|---|---|---|
| EP | 3501813 A2 | 6/2019 |
| EP | 3786076 A1 | 8/2020 |

*Primary Examiner* — Christopher R Demeree

(57) ABSTRACT

The invention relates to packaging of a food product comprising a container and at least one film for insulating the food product in place in the container, said film being adapted to be attached to at least one part (6, 7, 8, 9) of the container. The container is made of cardboard or is cellulose-based, adapted to change from a first configuration in the form of a flat sheet (12) provided with pre-cuts or cutouts (17) to a second configuration, in which the folded sheet (12) defines a volume for receiving a food product and in that maintaining the shape of the container in the second configuration is carried out by attaching at least one film for insulating the food product to at least one part (8, 9) of the container. The invention also relates to a packaging device with such packaging.

3 Claims, 2 Drawing Sheets

(56) References Cited

U.S. PATENT DOCUMENTS

| | | | | |
|---|---|---|---|---|
| 11,434,038 | B2 * | 9/2022 | Tye | B65D 5/20 |
| 12,103,743 | B2 * | 10/2024 | Mero | B65D 5/0005 |
| 2009/0155419 | A1 * | 6/2009 | Gan | A21D 10/02 426/62 |

* cited by examiner

[Fig. 1]
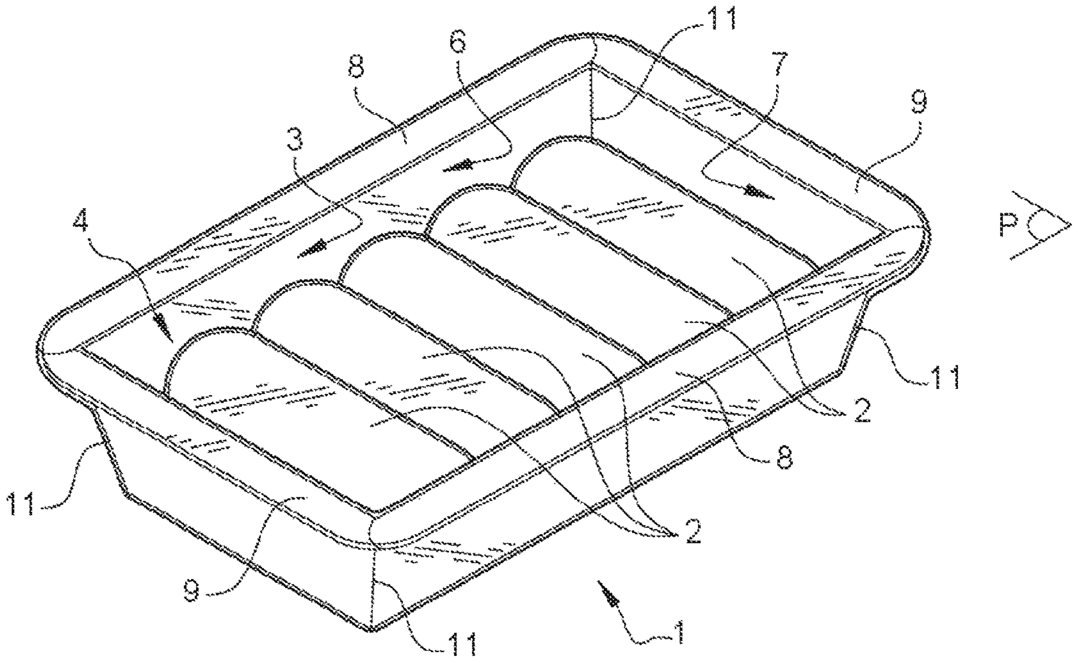
[Fig. 2]
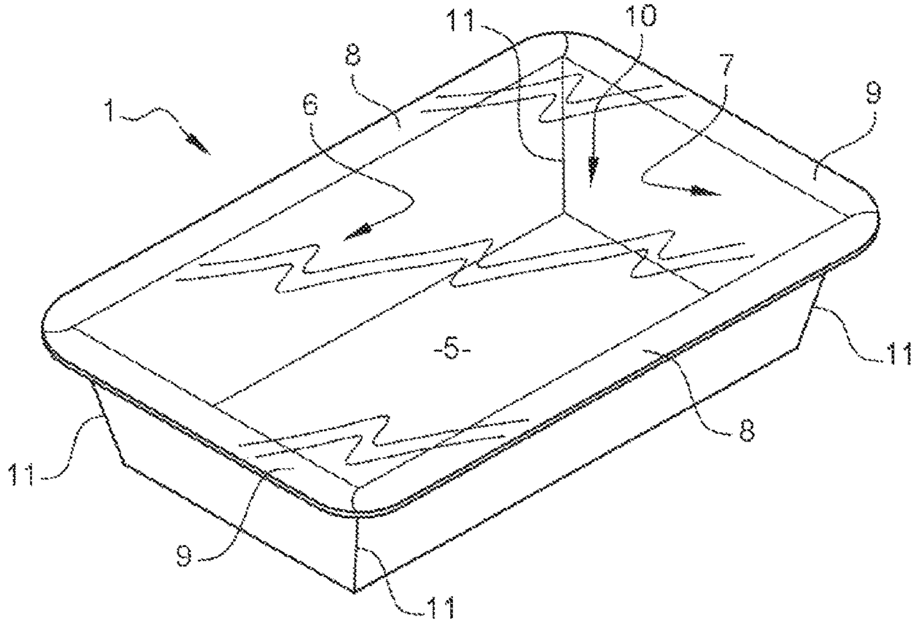

[Fig. 3]
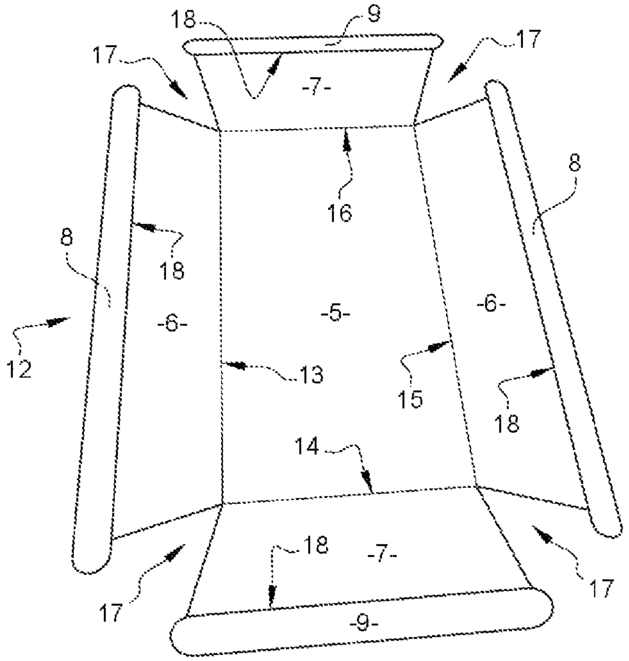
[Fig. 4]
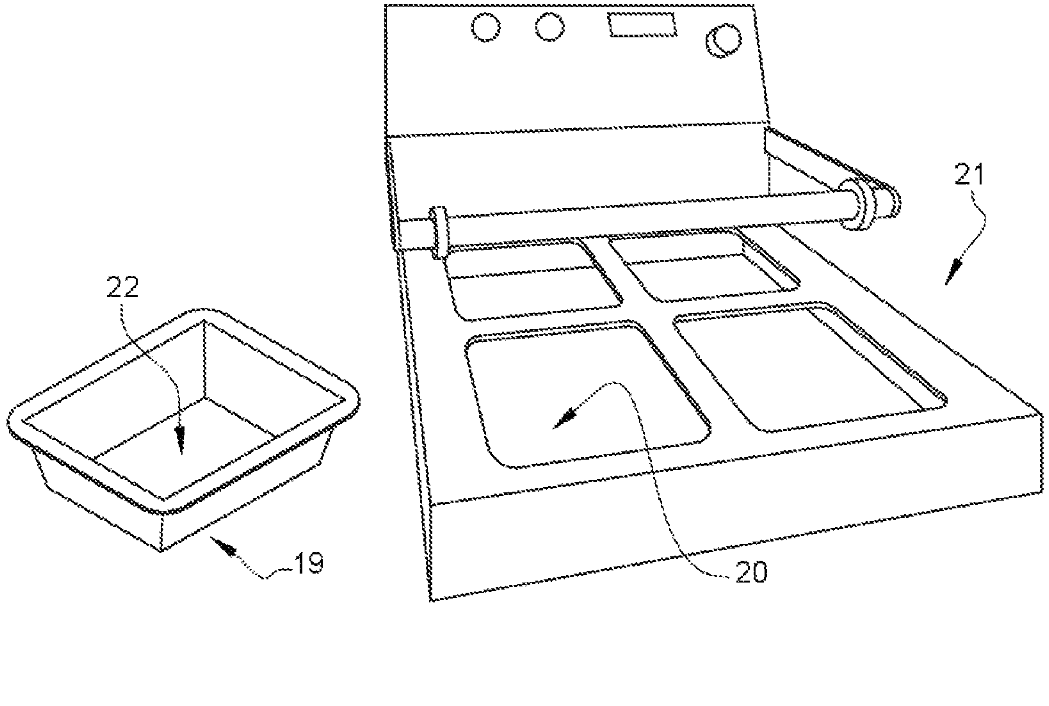

PACKAGING OF FOOD PRODUCTS AND ASSOCIATED PACKAGING DEVICE

DISCLOSURE

The invention relates to packaging of food products as well as to an associated packaging device. Subsequently, the term product will also be used to designate a food product. The term "food products" denotes here fresh, raw or cooked, prepared or not, whole or sliced products, of animal or vegetable origin. By way of non-limiting examples, mention may be made of meat, fish, vegetables, fruits, mushrooms, confectioneries, cakes and baked goods, sea vegetables, shellfish, dishes or cooked products. All these products have the particularity of having short consumption or storage times, ranging from a few days to a few weeks. When they are not sold in portions, therefore charged and/or packaged directly by the vendor during purchase, these products must be presented and kept under optimal hygiene conditions. In particular, they must not be in contact with the exterior in order to avoid any contamination and/or soiling by microorganisms, by humans or animals and must not be in contact with the ambient air to prevent any oxidation and/or chemical reaction with air.

DESCRIPTION OF RELATED ART

Thus, they are packaged in containers of different shapes and types. Such packaging is frequently provided with a transparent film or cover that ensures the closure of the container and the insulation of the product from the ambient air. Such packaging allows the consumer to view the product in its packaging, while preventing the consumer from being able to touch the product directly. Packaging for preserving the product under a controlled atmosphere or under an air vacuum is also known. This type of packaging offers numerous advantages. In addition to an optimal shelf life, packaging under vacuum or under a controlled atmosphere preserves the initial color of the product and limits any exudation of the product as much as possible. In addition, since the film ensuring the closure of the container is transparent, the consumer also benefits from a visual overview of the product. This type of packaging was developed because it makes it possible to easily adapt to any geometric shape and/or volume of the product, whether the product is presented whole, by the slice, alone or with other products, flat or not. So-called skin packaging is known, comprising a flat sheet or a tray, which is generally made of polymer-based or cardboard-based material, coated with a first hygiene film or liner ensuring the seal between the product and the container and on which the product rests. A vacuum film, called skin, completely covers the product and is welded, once the vacuum is produced on the liner, on the periphery of the product on the sheet or the tray.

Current regulations are directed toward the progressive disappearance of packaging made of non-recyclable polymers, which promotes packaging based on cardboard, wood, bamboo, plant fibers or more generally cellulose. There is currently a broad diversity of shapes and/or volumes for tray-type packaging. The trays, made of polymers or of a cellulose-based material, are manufactured and equipped with sealing film or liner and delivered in this way, in shape and ready for use, to the user who will position the product in the tray before it is placed under vacuum or closed. Packaging of this type is thus known from U.S. Pat. No. 5,631,036, US-A-2016/0340 098 or GB-A-2 557 662. The transport of such trays is not optimal because an empty, formed tray occupies a large space, hence high transport costs, all the more significant as fuel costs are high. Likewise, these trays occupy a large volume when they are stored, as the user generally needs to have a plurality of sizes of trays according to the product to be packaged. EP-A-3 786 076 describes packaging made from a cardboard blank. Shape is maintained by adhesive tabs. EP-A-3 501 813 discloses a machine for folding a sheet of cardboard having pre-cuts to obtain trays.

There is therefore a need for packaging of food products that is easy to use, store and transport while remaining easily adaptable to the constraints of various products, while optimizing production costs and implementation.

The invention proposes responding to these needs by offering a solution for packaging food products that is simple, easy to install and at controlled cost.

BRIEF SUMMARY OF THE INVENTION

To this end, the invention relates to packaging of a food product comprising at least one cardboard or cellulose-based container defining a food product receiving volume and at least one film for insulating the food product when the food product is in place in the container, said film being adapted to be attached to at least one part of the container, said container being adapted to change by folding from a first planar sheet configuration, which is provided with pre-cuts or cutouts and in which the sheet does not define any volume for receiving a food product, to a second configuration, in which the folded sheet defines a volume for receiving a food product, maintaining the shape of the container in the second configuration being carried out by attaching at least one film for insulating a food product to at least one part of the container, characterized in that the container adapted to change from the first to the second configuration is for single use and in that the packaging comprises another reusable part formed by a mold which has dimensions and a shape corresponding to those of the container when the container is in the second configuration.

Thus, by virtue of the invention, there is a solution that makes it possible to optimize the transport and storage of containers, since the latter are initially flat in the form of sheets, and are therefore easily stackable. A mold or similar device makes it possible, by deformation, under pressure and/or by suction, to fold the sheet and to produce the desired volume for the container, when the container is at the user's premises and not, as in the prior art, at the premises of the container manufacturer. It is thus possible, by virtue of the invention, to carry out the shaping of the container, the filling thereof with the food product and the closure of the container in an operation carried out at the premises of the user. Such a solution, in addition to limiting the steps carried out at the production site, makes it possible to limit the risks of contamination during packaging of the product. Indeed, the operations of shaping, filling and closing the container can be carried out in a limited time.

According to advantageous but optional aspects of the invention, such packaging may comprise one or more of the following features:

When the container is in its second configuration, it is maintained in shape by a sealing film sealed on the free upper end of the container, said end extending outwardly relative to the walls of the container and forming a flange.

When the container is in its second configuration, it is maintained in shape by a vacuum film sealed on the bottom, the walls and the free upper end of the container, said end extending outwardly relative to the walls of the container and forming a flange.

When the container is in its second configuration, it is maintained in shape by a vacuum film and by a closure film, the two films being sealed together on the free upper end of the container extending outwardly relative to the walls of the container and forming a flange.

The changeover by deformation from the first to the second configuration is carried out by pressure variation, suction and/or pressure, on either side of the sheet.

The changeover by deformation from the first to the second configuration is carried out when the food product is in place on the sheet, the weight of the food product participating in the deformation of the sheet.

At least part of the sheet is provided with a plurality of pre-cuts or cutouts defining a plurality of usable volumes of the container once the sheet has been deformed and folded.

The sheet is provided with a plurality of parts each defining at least one volume of a container.

The sheet is provided with a plurality of parts each defining a volume of a container, all the containers being identical.

The sheet is provided with means ensuring the immobilization of the sheet at a given position during the changeover from the first to the second configuration.

The invention also relates to a packaging device comprising at least one support which can be removed from the mold and is provided in an tray erector/tray sealer type apparatus, also ensuring the sealing of the container once in its second configuration with a vacuum film and/or a closure film.

According to advantageous but optional, such a device may comprise one or more of the following features:

The tray erector/tray sealer type apparatus is equipped with at least one receiving cavity, forming a support for at least one mold.

The tray erector/tray sealer type apparatus is equipped with a plurality of receiving cavities of the same geometric configuration, forming the supports of a plurality of identical molds.

The tray erector/tray sealer type apparatus is equipped with a plurality of receiving cavities for different geometric configurations, forming the supports of a plurality of different molds.

BRIEF DESCRIPTION OF THE VIEW OF THE DRAWINGS

The invention will be better understood and other advantages thereof will become more clearly apparent on reading the following description, given solely by way of non-limiting example and with reference to the accompanying drawings, in which:

FIG. 1 is a simplified perspective view of packaging according to one embodiment of the invention, a food product being schematically shown, a vacuum film being in place, FIG. 2 is a view similar to FIG. 1, on the same scale, of empty packaging, a closure film being in place, FIG. 3 is a perspective view, on the same scale, of the container shown in FIGS. 1 and 2, before folding, the pre-cuts having been carried out, and FIG. 4 is a simplified perspective view, on another scale, of a part of the packaging device, namely the apparatus adapted for shaping, filling and closing the container of FIG. 1 to 3, a mold for shaping the container shown ready to be inserted into the device.

DETAILED DESCRIPTION OF THE INVENTION

FIG. 1 is an illustration of packaging 1 of a food product. The packaging 1 is a tray made of a rigid material advantageously insensitive to thermal changes, which can thus be placed in a refrigerator, a cold room or a freezer. Similarly, the material used to produce the tray 1 is of so-called food quality, i.e., non-toxic, non-allergenic and without possible interaction with the product placed in the packaging and/or with the user. This material, in the case of the implementation of the invention, is a honeycomb-type material, multi-ply cardboard, honeycomb cardboard or more generally a cellulose-based material. In these different cases, with the material, known per se, being sensitive to moisture and also for hygiene reasons, a hygiene film, known per se and not shown, is bonded over the entire surface of the material which will be in contact with the food product, therefore de facto on the internal faces of the lateral walls and the bottom of the tray 1. In this way, the product is never in direct contact with the constituent material of the tray 1, which avoids any soiling of the product for example by particles that detach from the constituent material of the tray. The wetting of the material by exudates coming from the product is also prevented, which could affect the mechanical strength and/or resistance of the tray 1 and promote the proliferation of microorganisms. Such a hygiene film is chosen to be easy to recycle, when the constituent material of the tray 1 is recycled. As an example, mention may be made of a polymer-based film, for example made of polyethylene terephthalate (PET), ethylene vinyl alcohol (EVoH), polyethylene (PE), cellulose or other. This film is attached by known techniques, in particular by heat bonding or welding, over the entire surface of the constituent material of the tray 1, at least on the face thereof that is intended to receive the product. Alternatively, both faces of the walls and the bottom of the tray are provided with the hygiene film.

Currently regulatory trends are aimed at reducing the amount of waste, in particular waste related to human food. Also, the packaging of food products corresponding to the consumption of a given number of persons, by meals and/or per day, is increasing. Similarly, packaging is being developed having a minimum of material, easy to recycle or at least having a minimum of environmental impact during its destruction.

Here, the food product is shown schematically by a plurality of portions 2, of elongate shape, of product. As a reminder, the term “food product” or “product” refers to any type of food product, of animal or vegetable origin, whether raw, pre-baked or cooked, transformed or not, whole or in portions, intended for human or animal food. By way of non-limiting examples, mention may be made of products that are solid, doughy, pasty, powder, meat based, fish, shellfish, sea vegetables, fruit, vegetables or cooked dishes. In every case, the food products have, by definition, a limited shelf life, generally at most 15 to 20 days, since the products have not benefited from any physical, thermal, chemical or other treatment, such as for example canning, aimed at significantly increasing the shelf life. Such products were able to be frozen beforehand, but they are thawed when they are offered for sale. The freezing must be mentioned as well as the health risk that the consumer has incurred in the case of freezing after thawing.

FIG. 1 shows a tray containing a vacuum product. In general, the presentation of food products in a tray regardless of the size and/or shape of the tray as well as the number of portions and/or the quantity of products present in the tray makes it possible, by the presence of an insulating film formed by a transparent vacuum film 3, also designated by the term skin or skin film, covering the product and insulating it from the exterior, for the consumer to view the product before the purchase, optionally touch the product but without direct contact therewith. This contributes to the current development of the so-called skin packaging, i.e., packaging with a transparent and sealed film which makes it possible to maintain the vacuum of the product. The skin film 3 is a film known per se. It is for example a film made of PE (polyethylene) or PET (polyethylene terephthalate) with a thickness of between 80 μm and 150 μm.

The skin film 3 adheres to the product 2 and holds it on the bottom 5 of the tray 3 in the desired position during the filling of the tray 3. Maintaining the vacuum in the packaging by the film 3 called skin makes it possible to extend the shelf life and therefore the expiration date which can go beyond twenty days. Maintaining the product 2 under vacuum also makes it possible to preserve the original colors of the product and to avoid any phenomenon of juice exudate or other biological liquids which can harm the visual appearance of the product.

The vacuum film 3 will subsequently be designated hereinafter by the expressions "skin" or "skin film", in order to facilitate reading. Such a skin film 3 is sealed on the inner faces 6, 7 of the walls respectively defining the length and width of the tray 1 shown and on the bottom 5 of the tray 1, in the configuration shown in FIG. 1. The sealing of the film 3 is carried out so that the product 2 is immobilized in the tray 1. This immobilization corresponds to a position defined by the user when the product 2 is placed in the tray 1. This maintaining the product 2 in position in the tray 1 also participates in maintaining the quality of the product, in particular when it is in a plurality of portions, preventing them from jostling together during transport, resulting in deterioration of the product.

In every case, regardless of the shape and/or dimension of the tray 1, the nature of the product, its volume and/or its weight, the film 3 is sealed on the free ends 8, 9, respectively, the walls 6 and 7 of the tray 1. These ends 8 and 9 extend towards the outside of the tray 1 and in fact form a continuous flange over the entire periphery of the opening 4 of the tray 1. Here, the ends or flanges 8, 9 extend in a plane P coplanar with the plane of the opening 4 of the tray 1. Alternatively, the flanges extend in a plane not parallel to that of the opening 4 of the tray 1. It will be noted that the junction areas between the flanges 8 and 9, therefore the angles in the case of the tray 1, are rounded. As a variant, the angles are not rounded. Advantageously, it is possible to provide, on a part of a flange, either an overflow of the skin film 3 or a partial sealing of the film on the flange, in order to produce a gripping tab facilitating the engagement and removal of the film 3 by the consumer of the packaged product.

In FIG. 1, the product 2 occupies substantially the entire available surface of the bottom 5 of the tray 1. As a variant, it only occupies a part thereof. Indeed, with a vacuum film 3 it is possible to fill the tray 1 more or less by placing fewer products or by placing the product in layers, which makes it possible to vary the weight of the product without modifying the nominal volume of the tray 1. In this case, the vacuum film 3 is always placed on the products by flattening them in the tray, whatever the volume and/or the surface area occupied by the products in the tray 1, only the dimensions of the film 3 are adapted.

FIG. 2 shows a tray 1 without product 2, in order to more easily view the faces 6, 7 and the bottom 5 of the tray 1. Due to the absence of product 2 in the tray 1, the skin film 3 is not present. FIG. 2 shows the case of a tray 1 intended to receive a product that does not support the vacuum, for example due to its fragility, its sensitivity to crushing or the like. By way of non-limiting examples, mention may be made of fresh mushrooms, edible flowers, fresh fruit with fine and/or fragile skin, such as strawberries, raspberries, blackberries, blueberries, blackcurrants, redcurrants, apricots, peaches or others. Such food products are placed, in bulk or in rows, in the internal volume of the tray 1. These products are insulated from the outside by an insulation film formed here by a closure film or cover 10. Such a film 10, known per se, and for example made of polyethylene (PE), polyethylene terephthalate (PET), polypropylene (PP) and of a thickness between 10 μm and 60 μm.

As for the tray 1 shown in FIG. 1, the film 10 is sealed, by techniques known per se, on the flanges 8 and 9, occupying the entire available surface of the latter. As indicated above, a part of the film 10 is either overflowing from one of the flanges 8, 9 or not completely sealed in order to form a gripping tab of the film. The nature and/or thickness of the cover 10 means that the cover is relatively easy to perforate. Unlike the skin film 3, the cover 10 therefore does not allow the product to be touched without being in direct contact therewith, namely unless the cover 10 is torn. However, the cover 10 constitutes a barrier insulating the product from the air and external soiling, which makes it possible to preserve the freshness of the product. Thus, in every case, regardless of the film 3 or the cover 10 protecting and insulating the contents of the tray 1 from the outside, this film 3 or this cover 10 is attached to at least part of the tray 1, namely at least on the flanges 8 and 9.

As is more particularly apparent from FIG. 2, the walls 6 and 7 are not contiguous at the junction zone 11 between the walls 6 and 7. In other words, the corners 11 of the tray 1 defined by the junction of the walls 6 and 7 are open, there being no continuity of material at the corners 11. The holding of the walls 6 and 7 in mutual contact at the corners 11 is obtained by the presence of the film 3 or of the cover 10, which connects at least all of the flanges 8 and 9 to one another, with continuity in the region of the corners 11. It is understood that, in the case of a tray 1 with a skin film 3, the continuity of material produced by the film 3 also relates to the walls 6 and 7. Thus, the maintaining in shape of the tray 1 is ensured by the film skin 3 or by the cover 10. In the case shown in FIG. 2, since the corners 11 are not closed, there is a passage of air and/or liquid through them, whether into or out of the tray 1. This, in itself, is not a problem because, in general, the products contained in such a tray 1 do not need to be insulated from the outside air, which does not affect or hardly affects their shelf life. In another embodiment where it is desired to optimize the sealing of the tray 1 by avoiding any exudate leakage or any entry of air, a total adhesion of the skin 3 should be ensured at the corners 11 of the tray 1. In this case, a double folding is carried out, which makes it possible to produce 45° chamfers at the corners. In this configuration, the adhesion of the skin 3 at the corners is total, with no separation between the skin 3 and the tray 1, therefore no potential leakage of exudate or entry of air.

According to the invention, the tray 1, whether it is provided once filled with a skin film 3 or a cover 10, it is obtained from a sheet 12, shown in FIG. 3. Such a sheet 12 is flat and, here, rectangular in shape. The lateral walls 6 and 7 respectively defining the large sides and the small sides of the tray 1 are connected only by one side, 13 to 16 respectively, to the small sides and large sides of the rectangular bottom 5. Thus, there are cutouts 17 between the walls 6 and 7, at edges of the sides opposite the walls 6 and 7. Alternatively, only pre-cutouts, in dotted lines for example, are provided, either over the entire thickness or at the thickness of the sheet, the cutouts 17 being made during the shaping of the tray 1. In another variant, the cutouts 17 are replaced by accordion folds, which makes it possible to have continuity of material at the corners 11. In another embodiment of the invention, a plurality of lines of pre-cutouts are arranged on the walls 6 and 7, thus making it possible, from one sheet 12, to define a plurality of useful volumes of a tray 1, by varying the height of the walls 6 and 7.

FIG. 3 shows that the flanges 8 and 9 are made from the fold lines 18 provided on the sheet 12. In FIG. 3, the lengths of the flanges 8 and 9 are greater than the lengths of the walls 6 and 7 on which they are made. In this way, once the tray 1 has been shaped by folding, there is partial overlap of the flanges 8 and 9 at the corners 11. Such an overlap participates in holding the tray in shape by a skin film 3 or by the cover 10. According to another advantageous embodiment, there is no overlap of flanges 8 and 9, the latter being of the same length as the walls 6 and 7. Alternatively, tabs with notches are made on the flanges 8 and 9 and extend outwardly, coplanar with the flanges 8 and 9. These tabs make it possible to secure the holding in position of the tray 1 during its shaping.

The shaping of the tray 1 from the sheet 12 is now described with reference to FIG. 1 to 4. The sheets 12 are delivered stacked flat at the premises of the end user, which stores them in this position or uses them immediately.

To carry out the shaping of the trays 1 from the sheet 12, the filling of the tray 1 and the sealing of the film 3 or 10, the invention also relates to a packaging device. Such a device comprises at least one reusable mold 19 for receiving the sheet 12 and its changeover to the second configuration wherein the tray 1 is shaped, ready to receive a product. The device also comprises at least one cavity 20 forming a support, also reusable, for the mold 19 and provided in a tray erector/tray sealing type apparatus which ensures the sealing of the tray 1 with a skin film 3 or a cover 10 when the product is in place in the tray 1. Such a packaging device therefore associates a permanent and reusable part, namely the mold 19, the cavity 20 and the apparatus, known per se, for filling and sealing the film, with a non-reusable part of limited life, namely the tray 1. Indeed, once the skin film 3 or the cover 10 is removed and the product removed from the tray 1, it is no longer possible to close the container, the latter tending to open because the walls 6, 7 are no longer held in position. Furthermore, once the skin film 3 or the cover 10 is removed, by tearing and/or detaching, it is no longer possible to seal a new film 3 or cover 10 on the flanges 8, 9 and/or the walls 6, 7 and the bottom 5 of the tray 1. Due to its construction, such a tray uses a minimum of material and therefore, even though for single use, limits the impact of the recycling on the environment by this smaller amount of material to be recycled. Such a packaging device optimizes the re-use of elements and the transportation and storage of the packaging, while using apparatuses known per se, which contributes to limiting the impact of such packaging on the environment.

With such a packaging device, when the user wishes to package a product 2, he/she first inserts a mold 19 into a cavity 20 of complementary shape and dimensions cut into the device 21 of the tray sealing type as shown schematically in FIG. 4. Such an apparatus 21 also comprises a device for unwinding a skin film 3 or a cover 10 as well as vacuum and/or pressure means for folding the sheet 12. The mold 19 is made of a reusable, inert, rigid and advantageously recyclable material, for example made of a metallic material, polymer or cardboard. The geometric shape and the dimensions of the mold 19 correspond to those of the final tray 1 as shown in FIGS. 1 and 2. It is easily understood that the dimensions of the mold 19 are slightly larger than those of the tray 1 once finished, the latter being by definition made in the internal volume 22 of the mold 19. Such a mold 19 can be made in a plurality of detachable parts relative to one another, thus making it possible for example from one rectangular mold to obtain two square molds or two rectangular molds of smaller width than the initial mold.

The tray 1 is then shaped. Thus, the pre-cut sheet 12 is positioned over the opening of the mold 19 positioned in a cavity 20 of the apparatus 21. In another mode of shaping the tray 1, the pre-cut sheet 12 is first placed over the opening of the mold 19 before positioning the assembly in a corresponding cavity 20. It is then sufficient by means of a punch or a die and/or by suction, not shown, to exert a pressure and/or a negative pressure on the sheet 12 at the bottom 5 to deform the sheet 12 and fold the small sides 6 and the large sides 7 defining the walls of the package by bringing them closer together. The die or punch is adapted to also fold the flanges 8 and 9 toward the exterior of the mold 19, the flanges bearing against portions of complementary shape of the mold 19. When the flanges, as mentioned above, are equipped with tabs, said tabs allow clipping onto the flange of the mold 19, the flange being caught in the notches of the tabs.

In order to prevent any movement of the sheet 12 during the changeover from the first to the second configuration by folding, the sheet 12 is provided with means ensuring the immobilization of the sheet 12 in a given position in the mold 19. These means are, for example, reliefs provided either on the sheet 12 or on the mold 19 which are removably inserted into slots of complementary shape provided in the mold 19 or the sheet 12. As a variant, it involves other means, for example non-skid areas produced on the mold, immobilization by form fitting or other methods.

The sides 6 and 7 once the fold has been carried out are also supported in the mold against the side walls of the latter in a configuration where the tray 1 is shaped. Since the sides 6 and 7 are not welded together but contiguous, they define the open corners 11. In fact the corners 11 are made by closing the cutouts 17. At the corners 11, due to their lengths being greater than those of the walls 6 and 7, the flanges 8 and 9 overlap. Such an overlap contributes, when the tray 1 is formed, to holding the container in shape and to stiffening the walls 6, 7. Alternatively, the flanges 8, 9 have the same length as the walls 6, 7. In this case, there is no overlap of flanges 8, 9 at the corners 11, the film 3 or the cover 10 being sufficient to hold the container in shape.

During the next step, the user deposits the product 2 onto the bottom 5 of the tray 1. The weight of the product 2 participates in holding the tray 1 in the folded position. The assembly is then secured, that is to say held in this position, by placing the skin film 3 or the cover 10 which, by welding on at least the flanges 8 and 9, including at the possible overlaps of the flanges 8 and 9 in the corners 11, ensures not only that the tray 1 is maintained in shape but also insulates the product 2 from the outside. The invention makes it possible to have a container that changes from a first configuration where it is in the form of a flat sheet, such a configuration corresponding to the transport and/or storage of the packaging, to a second configuration wherein the container is in the active position, that is to say in the form of a tray ready to receive a product and then be sold after it is closed.

Alternatively, large sheets are provided with a plurality of pre-cuts for a plurality of packages, either of the same shape and/or volume or of different volumes and/or shapes. It is thus possible to position a sheet with the different pre-cuts above molds previously in place in cavities of the apparatus. Here, for example, in FIG. 4, four molds can be simultaneously placed in the four cavities, which makes it possible, in just one step by pressure from the die and/or suction of air between the mold and the sheet to form four packages simultaneously, which subsequently makes it possible after positioning of the products to seal four packages simultaneously.

As a variant, the small sides and the large sides are equipped with mutual connection means, for example tabs that are inserted removably during folding into slots arranged on the adjacent side.

Optionally, the external and/or internal faces of the walls and/or of the bottom of the tray, therefore of the sheet before folding, are printed with various markings and/or signs of recognition.

In some cases, an additional cover, in addition to the skin film 3, is positioned on the opening 4 of the tray 1. This cover, for example but not necessarily thinner and/or made of another material than the cover 10, is sealed on the flanges 8, 9 of the tray 1, above the film 3. In this way, a second barrier is obtained which prevents the consumer from touching the product 2 through the skin film 3, which could by repetition of this action, affect the vacuum resistance of the product and/or the appearance of the product 2.

In another embodiment where it is necessary to have total sealing between the outside and the product contained in the tray 1, the latter has no flanges 8, 9. Once the shaping is carried out in the mold, the tray 1 occupies the interior volume of the mold 19, without going beyond the mouth of the mold 19, therefore without going beyond the plane defined by the flanges of the mold 19. A frame of the same dimensions as the flanges of the mold 19 and made of cardboard is placed on the flanges of the mold 19. This frame is in one piece and is obtained by cutting, without breaking the material. The skin 3 or the cover 10 is attached to the frame, by wrapping it. Thus, the tray is maintained in shape with an upper flange without breaking material, and therefore without risk of leakage or air inlet at the flange.

In another embodiment, the height of the mold is reduced and it has no bottom. In other words, the mold is configured as a ring or frame which ensures that the tray 1 is maintained in shape.

The invention claimed is:

1. A packaging of a food product, comprising:

at least one cardboard or cellulose-based container defining a volume for receiving a food product and at least one film for insulating the food product when the food product is positioned in the at least one container, said at least one container adapted to change by folding from a first configuration being a planar sheet, which is provided with pre-cuts or cutouts and in which the planar sheet does not define the volume for receiving the food product, to a second configuration, in which the planar sheet is a folded sheet having a shape including a bottom, a plurality of side walls, a flange extending along each side wall of the plurality of side walls, and an opening defined by the flange of each said side wall of the plurality of side walls, the shape defining the volume for receiving the food product, wherein the shape of the folded sheet is maintained in the second configuration by attachment of said at least one film over the opening and to each said flange, the packaging further comprising a reusable mold which has dimensions and a mold shape corresponding to those of the shape of the at least one container when the at least one container is in the second configuration, and the at least one container changes from the first configuration to the second configuration via at least placement of the food product on the planar sheet when the planar sheet is in contact with the mold and before attachment of the at least one film.

2. The packaging according to claim 1, wherein, when the container is in the second configuration, the container is maintained in the shape by a vacuum film and by a sealing film, both being of the at least one film and being sealed together on the flange of each side wall of the plurality of side walls of the container.

3. The packaging according to claim 1, wherein the planar sheet corresponding to the first configuration of the container is provided with means ensuring immobilization of the planar sheet in a given position when the container changes from the first configuration to the second configuration.

* * * * *